(12) United States Patent
Kohira et al.

(10) Patent No.: US 12,308,446 B2
(45) Date of Patent: May 20, 2025

(54) BATTERY

(71) Applicant: Panasonic Intellectual Property Management Co., Ltd., Osaka (JP)

(72) Inventors: Kazutoshi Kohira, Hyogo (JP); Kazumichi Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 940 days.

(21) Appl. No.: 17/296,402

(22) PCT Filed: Nov. 21, 2019

(86) PCT No.: PCT/JP2019/045583
§ 371 (c)(1),
(2) Date: May 24, 2021

(87) PCT Pub. No.: WO2020/110888
PCT Pub. Date: Jun. 4, 2020

(65) Prior Publication Data
US 2022/0037723 A1    Feb. 3, 2022

(30) Foreign Application Priority Data

Nov. 30, 2018 (JP) ................... 2018-225884

(51) Int. Cl.
*H01M 50/107* (2021.01)
*H01M 50/147* (2021.01)
(Continued)

(52) U.S. Cl.
CPC ....... *H01M 50/107* (2021.01); *H01M 50/147* (2021.01); *H01M 50/152* (2021.01);
(Continued)

(58) Field of Classification Search
CPC .. H01M 50/107; H01M 50/52; H01M 50/186; H01M 50/559; H01M 50/152; H01M 50/184; H01M 50/55
(Continued)

(56) References Cited

U.S. PATENT DOCUMENTS

| | | | | |
|---|---|---|---|---|
| 2,332,456 A | * | 10/1943 | McEachron | H01M 50/182 429/169 |
| 2,606,942 A | * | 8/1952 | Bonin | H01M 6/08 429/82 |
| 2020/0083494 A1 | | 3/2020 | Bae | |

FOREIGN PATENT DOCUMENTS

| | | | | |
|---|---|---|---|---|
| JP | 7-105933 | | 4/1995 | |
| JP | 2000100407 A | * | 4/2000 | H01M 2/1229 |

OTHER PUBLICATIONS

JP-2000100407-A (translation) (Year: 2000).*
(Continued)

*Primary Examiner* — Matthew T Martin
*Assistant Examiner* — Paul Christian St Wyrough
(74) *Attorney, Agent, or Firm* — WHDA, LLP (57) ABSTRACT

A battery includes a battery can including a cylinder having a cylindrical shape and having an opening edge at one end, an electrode body, and a sealing member sealing an opening surrounded by the opening edge, in which the sealing member has a sealing plate electrically connected to a first electrode of the electrode body, a cap having a through hole corresponding to the sealing plate electrically insulated from the sealing plate, and a gasket that seals between the cylinder and the cap, the cap has a top plate having a ring shape and facing the cylinder, a side wall that is erected in an axial direction from a peripheral edge of the top plate and extends so as to overlap an outer surface of the cylinder, and a rib that is erected in the axial direction from the top plate inside of the side wall and extends so as to overlap an inner surface
(Continued)

of the cylinder, the gasket is compressed in a radial direction of the cylinder between the rib and the cylinder, and the battery can and the cap are electrically connected to a second electrode of the electrode body.

8 Claims, 5 Drawing Sheets

(51) Int. Cl.
    *H01M 50/152*     (2021.01)
    *H01M 50/184*     (2021.01)
    *H01M 50/186*     (2021.01)
    *H01M 50/55*     (2021.01)
    *H01M 50/559*     (2021.01)

(52) U.S. Cl.
    CPC ....... *H01M 50/184* (2021.01); *H01M 50/186* (2021.01); *H01M 50/55* (2021.01); *H01M 50/559* (2021.01)

(58) Field of Classification Search
    USPC .......................................................... 429/174
    See application file for complete search history.

(56) References Cited

OTHER PUBLICATIONS

International Search Report of PCT application No. PCT/JP2019/045583 dated Feb. 10, 2020.
Non-Final Office Action dated Dec. 1, 2023, issued in U.S. Appl. No. 17/298,412 (19 pages).

\* cited by examiner

BATTERY

CROSS-REFERENCE TO RELATED APPLICATIONS

This application is a U.S. national stage application of the PCT International Application No. PCT/JP2019/045583 filed on Nov. 21, 2019, which claims the benefit of foreign priority of Japanese patent application No. 2018-225884 filed on Nov. 30, 2018, the contents all of which are incorporated herein by reference.

TECHNICAL FIELD

The present disclosure relates to a battery.

BACKGROUND ART

Conventionally, in a battery using a bottomed cylindrical battery can, an annular groove is formed toward inside of the battery can on an opening end side of a peripheral wall of the battery can. A sealing plate provided with a gasket on a peripheral edge is disposed on the groove, an opening end of the battery can is bent inward in a radial direction of the cylinder, the opening end of the battery can is crimped to the peripheral edge of the sealing plate of the battery can via the gasket by using the groove, and thus airtightness of the battery is ensured (PTL 1).

CITATION LIST

Patent Literature

PTL 1: Unexamined Japanese Patent Publication No. H07-105933

SUMMARY OF THE INVENTION

However, in the battery having the groove and a crimping part, a sealing member is placed on the groove and the crimping part is formed on the sealing member via the gasket, and thus the battery is likely to be large as a battery in a height direction (a direction in which the electrode body and the sealing member face each other). A space in which the groove, the gasket, and the crimping part are disposed cannot house the electrode body and does not contribute to a battery capacity, and thus a capacity density of the battery is likely to decrease.

One aspect of the present disclosure relates to a battery including a battery can including a cylinder having a cylindrical shape and having an opening edge at a first end and a bottom closing a second end of the cylinder, an electrode body housed in the cylinder, and a sealing member fixed to the cylinder so as to seal an opening surrounded by the opening edge, in which the sealing member has a sealing plate electrically connected to a first electrode of the electrode body, a cap having a through hole corresponding to the sealing plate and connected to the sealing plate in a state of being electrically insulated from the sealing plate, and a first gasket that seals between the cylinder and the cap, the first end and the second end of the cylinder face in an axial direction, the cap has a top plate having a ring shape, disposed radially outside of the cylinder along a peripheral edge of the sealing plate, and facing the cylinder, a side wall that is erected in the axial direction from a peripheral edge of the top plate and extends so as to overlap an outer surface of the cylinder, and a rib that is erected in the axial direction from the top plate inside of the side wall and extends so as to overlap an inner surface of the cylinder, the first gasket is interposed between the rib and the cylinder in a state of being compressed in a radial direction of the cylinder, and the battery can and the cap are electrically connected to a second electrode of the electrode body.

A battery can be reduced in height.

Note that a comprehensive or specific aspect of the present disclosure may be achieved by a battery, device, system, method, or any combination thereof.

DESCRIPTION OF EMBODIMENTS

A battery according to one aspect of the present disclosure includes a cylindrical cylinder having an opening edge at a first end and a battery can having a bottom that closes a second end of the cylinder, an electrode body housed in the cylinder, and a sealing member fixed to the cylinder so as to seal an opening surrounded by the opening edge. The electrode body has a configuration in which, for example, a first electrode and a second electrode are wound with a separator interposed therebetween. One of the first electrode and the second electrode is a positive electrode, and the other is a negative electrode.

The sealing member has a sealing plate electrically connected to the first electrode of the electrode body and a through hole corresponding to the sealing plate, and has a cap connected to the sealing plate in a state of being electrically insulated from the sealing plate and a first gasket sealing between the cylinder and the cap.

Assuming that a direction in which both ends of the cylinder face each other is an axial direction, the cap includes a top plate having a ring shape, disposed radially outside of the cylinder along a peripheral edge of the sealing plate, and facing the cylinder, a side wall that is erected in the axial direction from a peripheral edge of the top plate and extends so as to overlap an outer surface of the cylinder, and a rib that is erected in the axial direction from inside of the side wall of the top plate and extends so as to overlap an inner surface of the cylinder.

The first gasket is interposed between the rib and the inner surface of the cylinder in a state of being compressed at least in the radial direction of the cylinder. The first gasket only has to extend continuously along the opening edge, and a shape of the first gasket is not particularly limited.

The rib may extend continuously along a side surface of the first gasket, or alternatively, may be divided into a plurality of parts and extend discontinuously along the side surface of the first gasket. Further, the rib may have a configuration in which a member separate from the top plate is connected to the top plate.

The battery can and the cap are electrically connected to the second electrode of the electrode body. The cap, which is in contact with the battery can, is electrically connected to the second electrode via the battery can. For example, it is sufficient that the outer surface of the cylinder and the inner surface of the side wall are joined.

The first gasket may be further compressed between the side wall of the cap and the cylinder. However, the side wall and the cylinder have the same polarity and may be in contact with each other, and it is therefore not essential that the first gasket is interposed between the side wall and the cylinder.

The side wall of the cap may have a first bent part that is bent inward in the radial direction of the cylinder. In this case, it is sufficient that an end of the side wall that faces outward in the radial direction from the first bent part is electrically connected to the cylinder.

The opening edge of the battery can may have a second bent part that is bent inward in the radial direction of the cylinder. In this case, an outer surface of the rib may be inclined along a bending direction of the second bent part. That is, the outer surface of the rib may be inclined along an inclination direction of the opening edge that faces outward in the radial direction of the cylinder from the second bent part.

A dimension of a connecting part (that is, a root) between the rib and the top plate in the radial direction of the cylinder may be larger than a dimension of a remaining part of the rib in the radial direction of the cylinder. The part of the root having a larger dimension may be provided continuously on an entire circumference of the rib or such parts may be provided intermittently along the rib. The parts of the root having a larger dimension and intermittently provided have an appearance like a cross rib intersecting the rib. Such a cross rib may be provided radially along the rib, for example. By increasing the dimension of the root of the rib, a strength of the rib can be increased and compressibility of the first gasket can be increased.

Further, in a case where the dimension of the root of the rib is increased, the outer surface of the rib can be inclined along the bending direction of the second bent part of the opening edge of the battery can. As a result, in the first gasket, unevenness of a thickness of the gasket between a first surface in contact with the top plate (including the rib) and a second surface in contact with the cylinder is suppressed. Therefore, when the first gasket is compressed, a region where sealing stress is generated between the first gasket and the cylinder or the top plate can be enlarged. That is, it becomes easy to suppress invasion of substances (liquids and gases) that can enter the battery can through a sealing region. Furthermore, in a case where an inclined surface is formed only on an outer peripheral surface of the rib, a larger space for housing the sealing plate can be provided in a center of the top plate, and this makes it easy to secure a region for providing a waterfall-proof mark on the sealing plate.

A surface of the first gasket in contact with the opening edge may have a protrusion (that is, a protruding surface) that protrudes in the radial direction of the cylinder in an unloaded state. The protrusion is compressed, and then the compressibility of the first gasket is significantly increased.

The unloaded state is a state in which pressure is not applied to the first gasket, that is, a state in the sealing member before being fixed to the cylinder of the battery can. The protrusion may have a plurality of slopes or curved surfaces that is inclined in opposite directions in the axial direction. For example, the first gasket may have a constricted part at an upper part of the protrusion (top plate side). This configuration can increase the sealing stress more remarkably.

A second gasket may be interposed between the sealing plate and the cap. The second gasket enhances airtightness between the sealing plate and the cap.

The rib and the second gasket may be provided apart from each other. In this case, it is sufficient that a holder erected in the axial direction from the top plate inside of the rib is provided, and the second gasket is held by the holder.

The rib and the second gasket may be in contact with each other. In this case, the second gasket is compressed between the rib and a peripheral edge of the sealing plate.

An inner diameter of the opening edge may be smaller than an inner diameter of a remaining part of the cylinder. At this time, a maximum value of an outer diameter of the side wall of the cap may be set to be equal to or less than an outer diameter of a part of the cylinder other than the opening edge.

Hereinafter, a battery according to exemplary embodiments of the present invention will be specifically described with reference to the drawings, but the present invention is not limited to the following.

First Exemplary Embodiment

Figure 1:
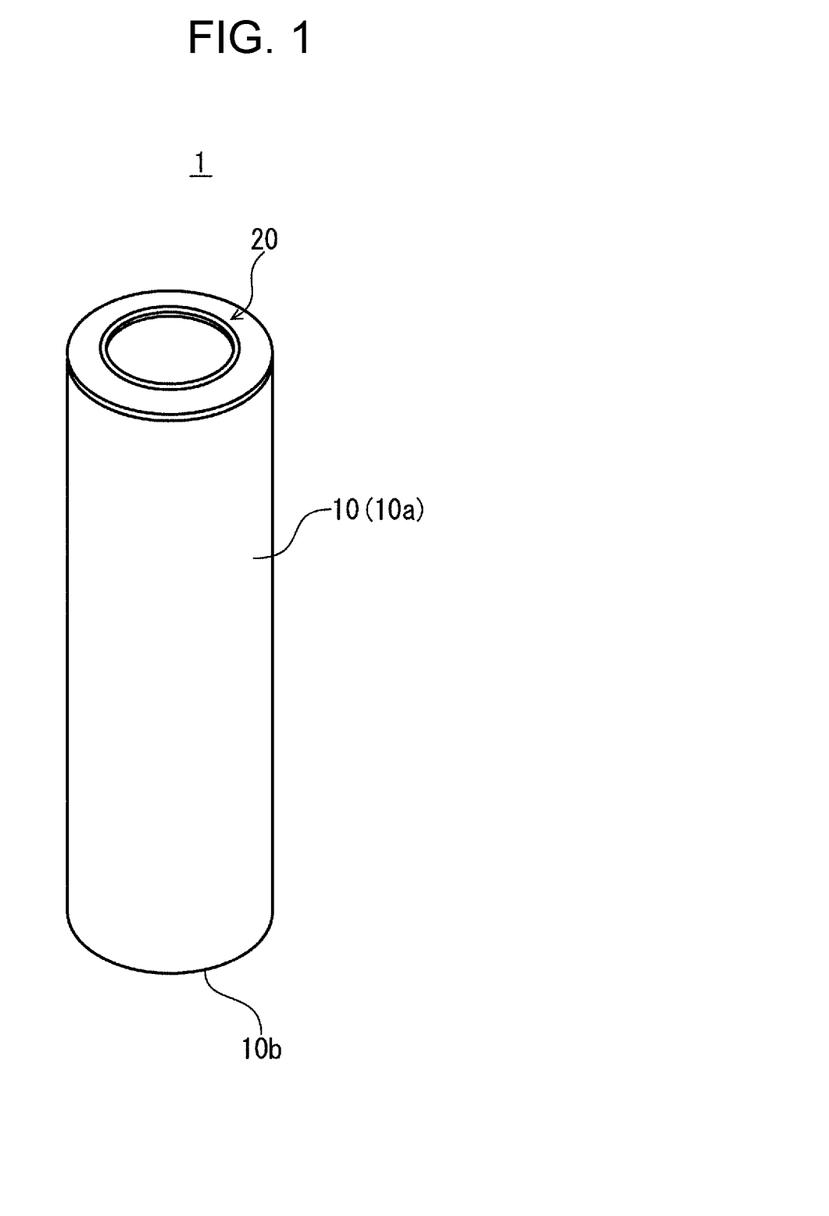
FIG. 1 is a perspective view of a battery according to a first exemplary embodiment of the present disclosure.
Figure 2:
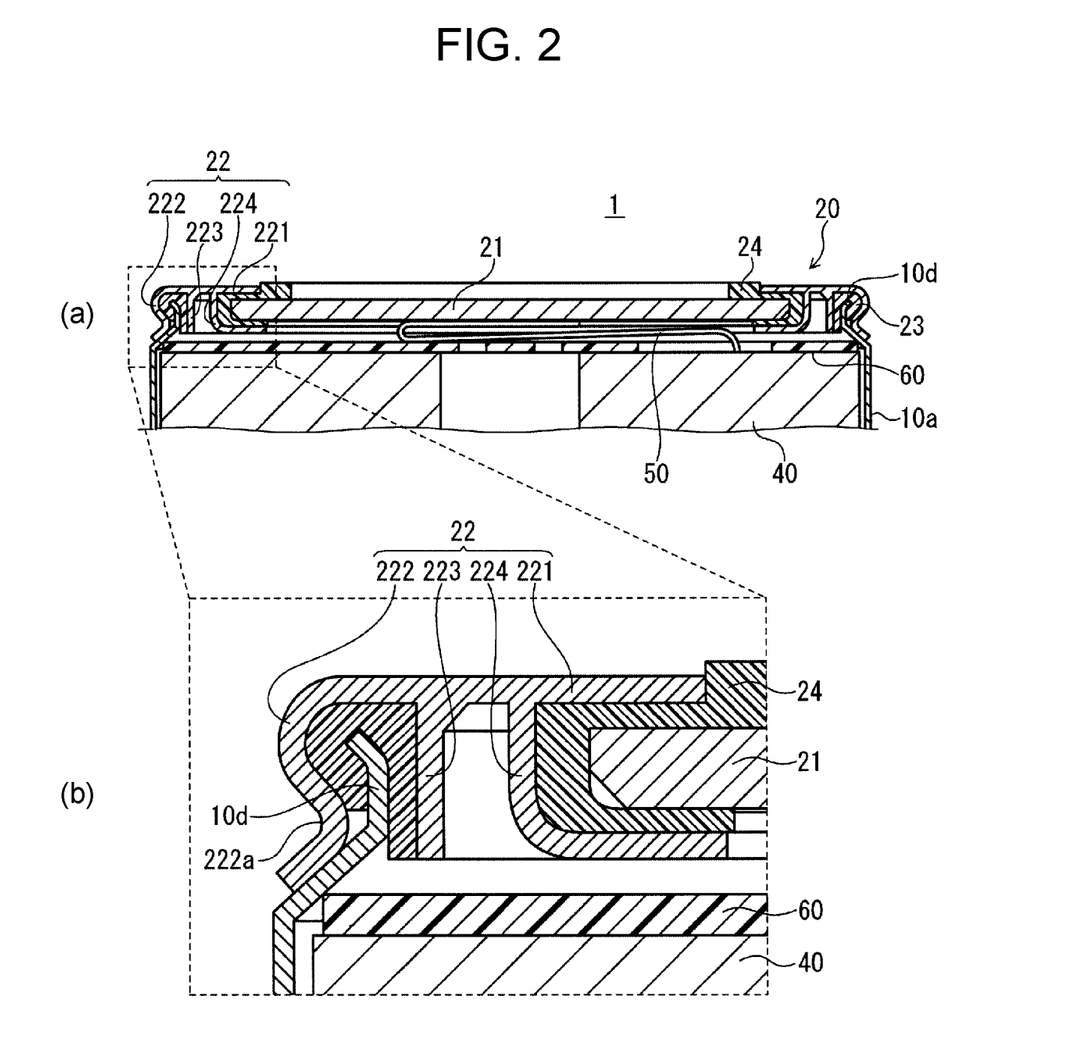
FIG. 2 is a vertical sectional view (a) and a partially enlarged view (b) of a main part of the battery according to the first exemplary embodiment.

FIG. 1 is a perspective view of a cylindrical battery according to the present exemplary embodiment. FIG. 2(*a*) is a vertical sectional view of a main part of the battery in FIG. 1, and FIG. 2(*b*) is a partially enlarged view of FIG. 2(*a*).

Cylindrical battery 1 includes battery can 10, electrode body 40 housed in battery can 10, and sealing member 20 sealing an opening of battery can 10. Battery can 10 includes cylindrical cylinder 10*a* having an opening edge at a first end and bottom 10*b* closing a second end of cylinder 10*a*. Electrode body 40 is housed in cylinder 10*a* of battery can 10. Insulating plate 60 is disposed between sealing member 20 and electrode body 40 to prevent a short circuit.

Sealing member 20 has sealing plate 21 electrically connected to the first electrode of electrode body 40 via lead 50, and cap 22 electrically connected to the second electrode of electrode body 40 and battery can 10. Cap 22 has a through hole corresponding to sealing plate 21, and sealing plate 21 is disposed so as to close the through hole. That is, sealing plate 21 is independent of cap 22, and even in a case where the cap is pressed against cylinder 10*a* and crimped, deformation of sealing plate 21 is suppressed. An outer surface of sealing plate 21 is substantially flat and is used as an external terminal of the first electrode.

Cylinder 10*a* and cap 22 are sealed by first gasket 23. Sealing plate 21 and cap 22 are electrically insulated and sealed by second gasket 24. That is, airtightness of battery 1 is ensured without forming a groove in battery can 10 as in the known art.

Assuming that a direction in which both ends of cylinder 10*a* face each other is an axial direction, cap 22 is disposed along a peripheral edge of sealing plate 21 and has ring-shaped top plate 221 that faces the cylinder in the axial direction. From the peripheral edge of top plate 221, side wall 222 extending so as to overlap an outer surface of opening edge 10*d* is erected in the axial direction. From inside of side wall 222 of top plate 221, rib 223 extending so as to overlap an inner surface of cylinder 10a is erected in the axial direction. Rib 223 extends along a side surface of first gasket 23 so as to continuously overlap the inner surface of opening edge 10d. The rib does not have to be continuously formed along an entire circumference of the side surface of first gasket 23. A plurality of ribs may be provided intermittently or discontinuously in the same circumferential direction.

Side wall 222 of cap 22 has first bent part 222a that is bent inward in a radial direction of the cylinder 10a. First bent part 222a has a function of increasing compressibility of first gasket 23. Opening edge 10d is pressed against first gasket 23 by first bent part 222a, and then first gasket 23 is compressed between opening edge 10d and rib 223 in the radial direction of cylinder 10a.

In the present exemplary embodiment, first gasket 23 is also interposed between side wall 222 and opening edge 10d and is also compressed between side wall 222 and opening edge 10d. This enlarges a compressed area of first gasket 23 and easily increases airtightness of the battery.

Here, a pressure for ensuring airtightness is applied from side wall 222 to rib 223 via opening edge 10d. In other words, rib 223 is interposed between sealing plate 21 and opening edge 10d, and thus the pressure for ensuring airtightness is not directly applied to sealing plate 21. Consequently, even in a case where side wall 222 of cap 22 is strongly pressed against cylinder 10a, deformation of sealing plate 21 is suppressed. The deformation of sealing plate 21 can be suppressed while increasing the pressure for ensuring the airtightness, and thus a high degree of airtightness can be ensured. Further, first bent part 222a is pressed against cylinder 10a and an end of side wall 222 facing outward in the radial direction of cylinder 10a from first bent part 222a is connected to cylinder 10a by welding or the like, and then, an electric connection is strengthened and a withstand voltage characteristic of battery 1 is also improved.

An outer surface of top plate 221 of cap 22 is substantially flat, and is suitable for use as an external terminal for the second electrode. That is, sealing member 20 may include two external terminals of different polarities. Therefore, a wiring structure for collecting current from the battery is simplified. In the above structure, the pressure for ensuring the airtightness is likely to be uniformly dispersed in the circumferential direction by rib 223.

Note that in a case where the sealing plate is disposed on the groove formed in the cylinder and the opening edge of the battery can is crimped to the peripheral edge of the sealing plate via a gasket as in the known art, it is difficult to make an opening end of the battery can flat.

In the present exemplary embodiment, second gasket 24 is provided apart from rib 223. Specifically, second gasket 24 is held by holder 224 that is erected in the axial direction from top plate 221 inside of rib 223. In this case, a space is provided between rib 223 and holder 224, and thus the stress applied to sealing plate 21 for ensuring the airtightness is reduced.

As a method of forming the rib integrated with top plate 221, for example, a method of forging a periphery of a part where the rib is to be formed on a rib forming surface can be mentioned. The rib is formed by unevenly distributing a material escaped from a forged region to the part where the rib is to be formed.

In terms of increasing capacity, heights of side wall 222 and rib 223 of cap 22 are both designed to be 5% or less of a height of battery can 10, for example. A height of holder 224 is appropriately selected depending on a thickness of sealing plate 21, a size of the second gasket, and the like.

An inner diameter of opening edge 10d is slightly smaller than an inner diameter of a remaining part of cylinder 10a. A maximum value of an outer diameter of side wall 222 of cap 22 is equal to or less than an outer diameter of a part of cylinder 10a other than opening edge 10d. Therefore, sealing member 20 does not protrude from cylinder 10a, and storage capacity of the battery is improved.

Second Exemplary Embodiment

Hereinafter, the same reference numerals are used for the same parts as those in the first exemplary embodiment or the parts corresponding to the first exemplary embodiment.

Figure 3:
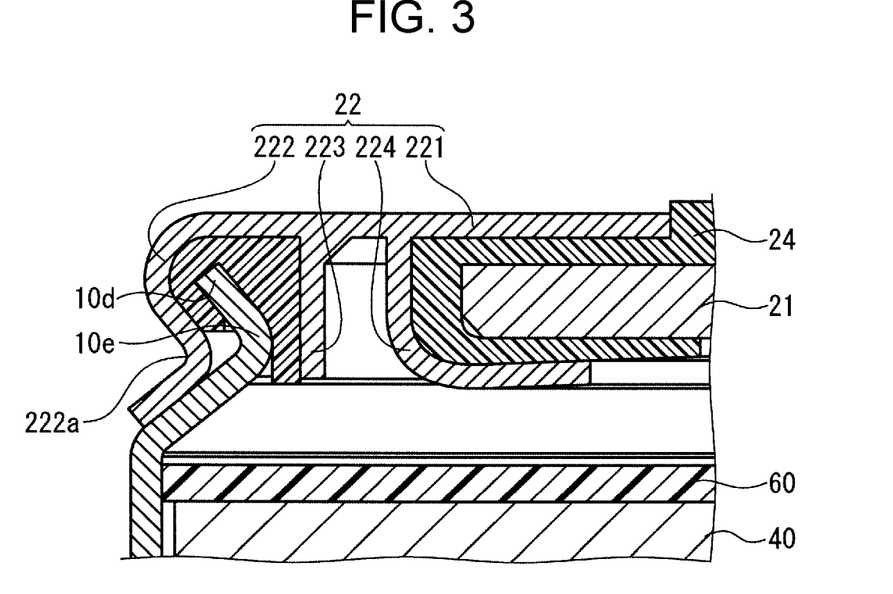
FIG. 3 is a partially enlarged view of a main part of a battery according to a second exemplary embodiment of the present disclosure.

FIG. 3 is a modification of an aspect shown in FIG. 2. In FIG. 3, opening edge 10d of battery can 10 is bent inward in the radial direction of cylinder 10a to form second bent part 10e. An inner surface of opening edge 10d in contact with first gasket 23 is inclined as a whole due to presence of second bent part 10e, and a contact area between first gasket 23 and opening edge 10d is large. Such an expansion of the contact area further enhances the airtightness of the battery.

Third Exemplary Embodiment

Figure 4:
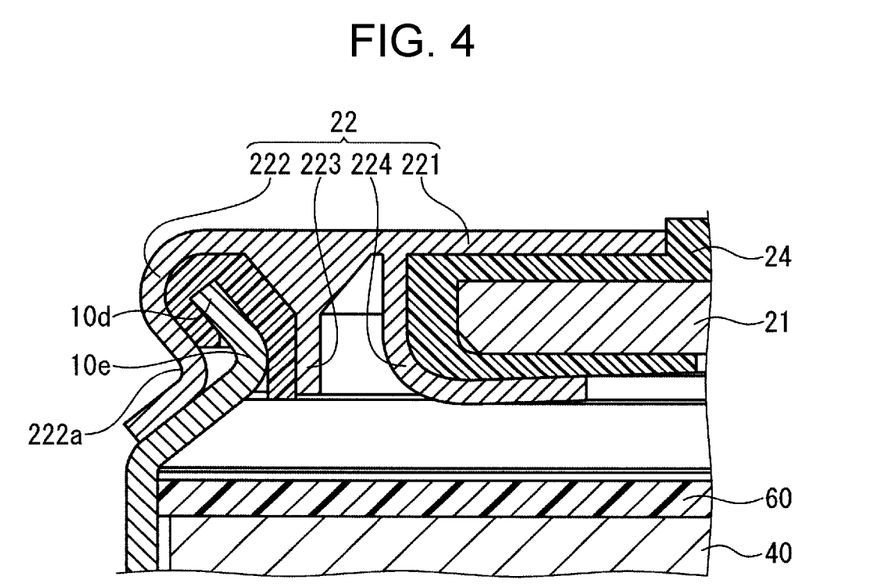
FIG. 4 is a partially enlarged view of a main part of a battery according to a third exemplary embodiment of the present disclosure.

FIG. 4 is another modification of the aspect shown in FIG. 2 (or FIG. 3). In FIG. 4 as well, opening edge 10d of battery can 10 is bent inward in the radial direction of cylinder 10a to form second bent part 10e.

In FIG. 4, an outer surface and an inner surface of rib 223 are inclined along a bending direction of opening edge 10d. Specifically, opening edge 10d is inclined as a whole outward from second bent part 10e in the radial direction of cylinder 10a, and the outer surface of rib 223 is inclined along an inclination direction of opening edge 10d. This greatly increases the compressibility of first gasket 23 interposed between opening edge 10d and rib 223. Further, unevenness of a thickness between top plate 221 of first gasket 23 and cylinder 10a is suppressed.

Here, a dimension of a connecting part (that is, a root) between rib 223 and top plate 221 in the radial direction of cylinder 10a is larger than a dimension of a remaining part of rib 223 in the radial direction of cylinder 10a. By increasing the dimension of the root, a strength of rib 223 is increased and an overall strength of cap 22 is also increased. That is, a force for pressing side wall 222 against cylinder 10a can be further increased. Therefore, the compressibility of first gasket 23 can be further increased.

Fourth Exemplary Embodiment

Figure 5:
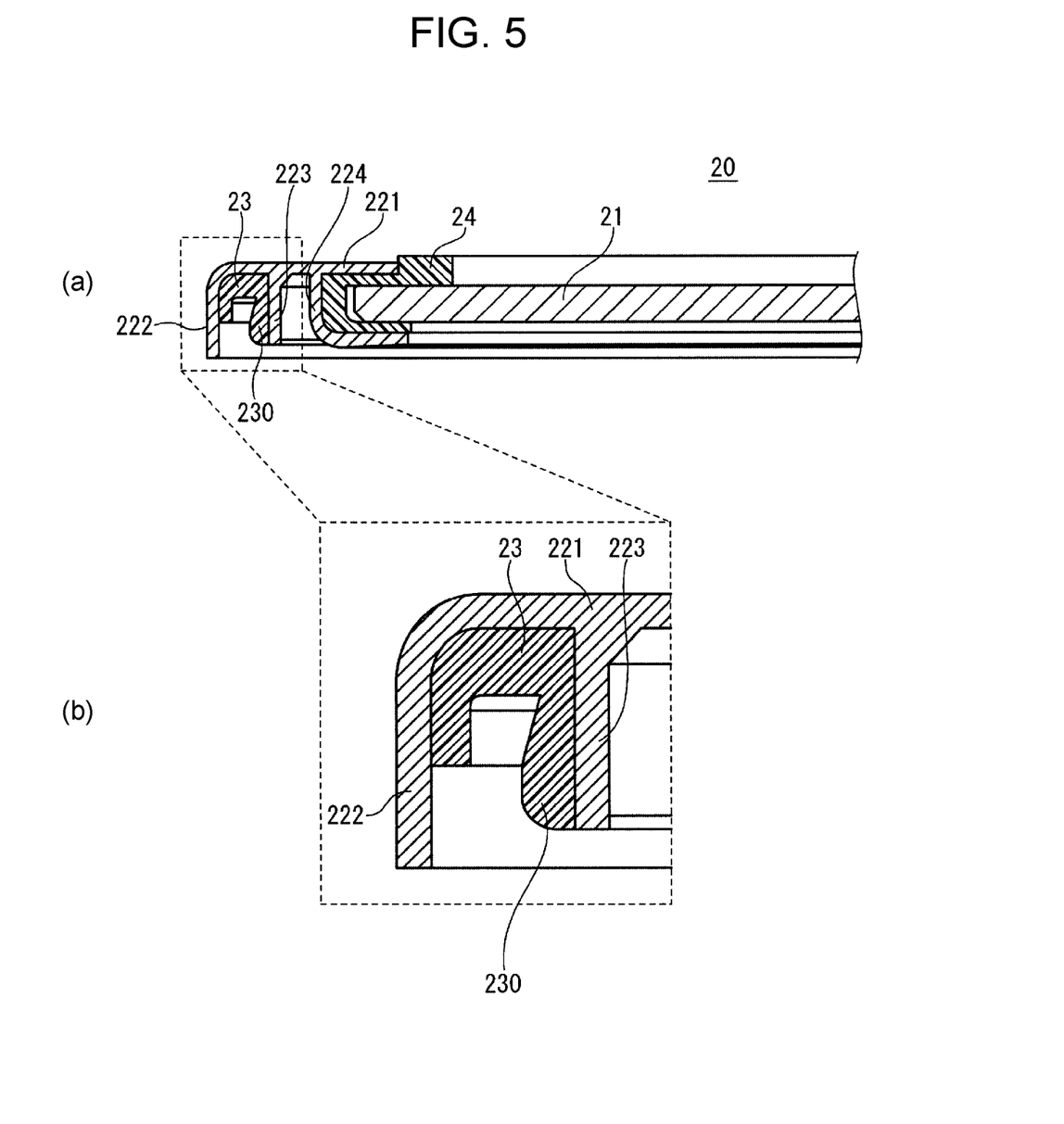
FIG. 5 is a vertical sectional view (a) and a partially enlarged view (b) of a sealing member before being fixed to a cylinder of a battery can according to a fourth exemplary embodiment of the present disclosure.

FIG. 5(a) is a vertical sectional view of an example of sealing member 20 before being fixed to cylinder 10a of battery can 10, and FIG. 5(b) is a partially enlarged view of FIG. 5(a). A surface of first gasket 23 in contact with opening edge 10d has protrusion 230 (that is, a protruding surface) that protrudes in the radial direction of cylinder 10a in an unloaded state. Protrusion 230 is compressed to some extent and a certain degree of airtightness is generated only by cap 22 being fitted into opening edge 10d of cylinder 10a of battery can 10. Furthermore, first bent part 222a, which is formed on side wall 222 of cap 22, remarkably increases the compressibility of protrusion 230 and further improves the airtightness of the battery. Note that first bent part 222a does not have to be provided if a certain degree of reliability of sealing can be ensured between rib 223 and cylinder 10a as in the present exemplary embodiment.

Fifth Exemplary Embodiment

Figure 6:
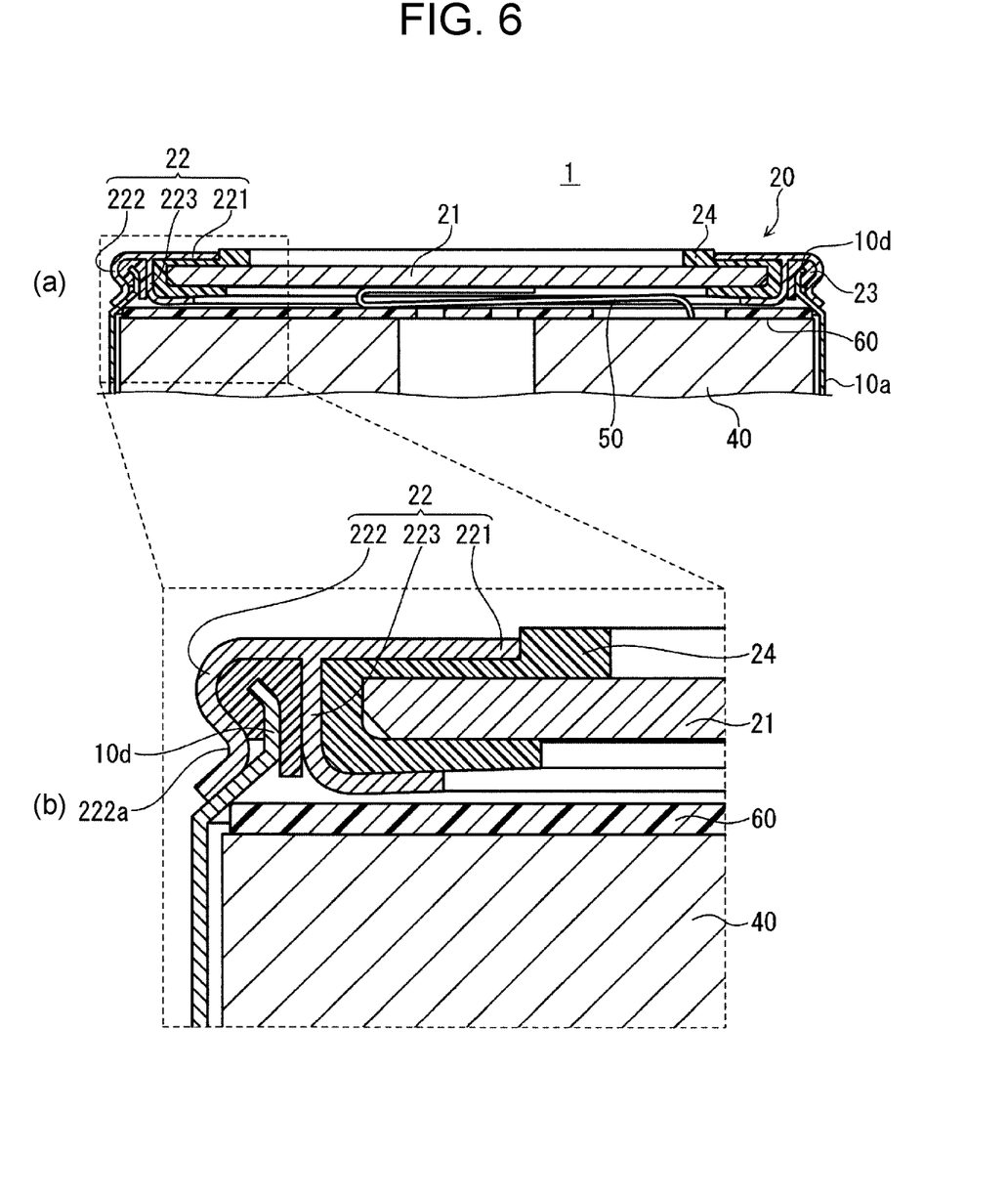
FIG. 6 is a vertical sectional view (a) and a partially enlarged view (b) of a main part of a battery according to a fifth exemplary embodiment of the present disclosure.

FIG. 6(a) is a vertical sectional view of a main part of a battery according to the present exemplary embodiment, and FIG. 6(b) is a partially enlarged view of FIG. 6(a). In the present exemplary embodiment, rib 223 and second gasket 24 are in contact with each other. In this case, the second gasket is compressed between the rib and a peripheral edge of the sealing plate. That is, it is not necessary to separately provide holder 224 in cap 22, and the structure of sealing member 20 is simplified. Meanwhile, rib 223 is provided with a function of a holder holding second gasket 24.

Hereinafter, other configurations of cylindrical battery 1 will be described.

The configuration other than the above is not limited, and a known configuration is used.

For example, a material of battery can 10 is not particularly limited, and may include at least one selected from iron, iron alloys (including stainless steel), copper, aluminum, aluminum alloys (alloys containing a trace amount of other metals such as manganese and copper), and the like. Further, battery can 10 may be plated.

Materials of cap 22 and sealing plate 21 can be selected from those exemplified for battery can 10.

First gasket 23 and second gasket 24 may be integrally molded with sealing plate 21 or cap 22 by insert molding or the like, or an annular resin body molded separately from sealing plate 21 or cap 22 may be fitted into sealing plate 21 or cap 22 and assembled. Materials of gaskets 23 and 24 are not limited, and for example, polypropylene (PP), polyphenylene sulfide (PPS), polyethylene (PE), polybutylene terephthalate (PBT), perfluoroalkoxy alkane (PFA), polytetrafluoroethylene (PTFE), polyamide (PA), and the like can be used.

Next, a configuration of electrode body 40 will be exemplarily described by taking a lithium ion secondary battery as an example.

Cylindrical electrode body 40 is a winding type and is configured by a positive electrode and a negative electrode spirally wound with a separator interposed therebetween. Lead wire 50 is connected to one of the positive electrode and the negative electrode. Lead wire 50 is connected to a central region of a bottom surface (lower surface) of sealing plate 21 by welding or the like. Another lead wire is connected to the other one of the positive electrode and the negative electrode, and the other lead wire is connected to an inner surface of battery can 10 by welding or the like. Further, another insulating plate (lower insulating plate) may be provided between electrode body 40 and bottom 10b. In this case, it is sufficient that the other lead wire is extended so as to pass through a through hole provided in the other insulating plate or bypass the other insulating plate.

(Negative Electrode)

The negative electrode has a band-shaped negative electrode current collector and negative electrode active material layers formed on both sides of the negative electrode current collector. A metal film, a metal foil, or the like is used for the negative electrode current collector. A material of the negative electrode current collector is preferably at least one selected from the group consisting of copper, nickel, titanium, alloys thereof, and stainless steel. A thickness of the negative electrode current collector is preferably, for example, from 5 μm to 30 μm inclusive.

The negative electrode active material layers include a negative electrode active material, and include a binder and a conductive agent as needed. The negative electrode active material layers may be deposited films formed by a vapor phase method (for example, thin film deposition). Examples of the negative electrode active material include Li metals, metals or alloys that electrochemically react with Li, carbon materials (for example, graphite), silicon alloys, silicon oxides, and metal oxides (for example, lithium titanate). A thickness of each negative electrode active material layer is preferably, for example, from 1 μm to 300 μm inclusive.

(Positive Electrode)

The positive electrode has a band-shaped positive electrode current collector and positive electrode active material layers formed on both sides of the positive electrode current collector. A metal film, a metal foil (stainless steel foil, aluminum foil, or aluminum alloy foil), or the like is used for the positive electrode current collector.

The positive electrode active material layers include a positive electrode active material and a binder, and include a conductive agent as needed. The positive electrode active material is not particularly limited, and a lithium-containing metal oxide such as $LiCoO_2$ or $LiNiO_2$ or a lithium-containing composite oxide containing three or more kinds selected from Ni, Mn, Co, and Al can be used. A thickness of each positive electrode active material layer is preferably, for example, from 1 μm to 300 μm inclusive.

Graphite, carbon black, or the like is used as the conductive agent included in each active material layer. An amount of the conductive agent is, for example, from 0 parts by mass to 20 parts by mass per 100 parts by mass of the active material. Fluororesin, acrylic resin, rubber particles, and the like are used as the binder included in the active material layer. An amount of the binder is, for example, from 0.5 parts by mass to 15 parts by mass per 100 parts by mass of the active material.

(Separator)

As the separator, a resin microporous membrane or a non-woven fabric is preferably used. As a material (resin) of the separator, polyolefin, polyamide, polyamideimide, or the like is preferable. A thickness of the separator is, for example, from 8 μm to 30 μm inclusive.

(Electrolyte)

A non-aqueous solvent in which a lithium salt is dissolved can be used as an electrolyte. Examples of the lithium salt include $LiClO_4$, $LiBF_4$, $LiPF_6$, $LiCF_3SO_3$, $LiCF_3CO_2$, and imide salts. Examples of the non-aqueous solvent include cyclic carbonates such as propylene carbonate, ethylene carbonate, and butylene carbonate, chain carbonates such as diethyl carbonate, ethylmethyl carbonate, and dimethyl carbonate, and cyclic carboxylic acid esters such as γ-butyrolactone and γ-valerolactone.

In the above description, the lithium ion secondary battery has been described as an example, but the present invention can be used in a cylindrical battery that seals a battery can by using a sealing member regardless of a primary battery or a secondary battery.

INDUSTRIAL APPLICABILITY

The battery of the present disclosure can be used for various can-shaped batteries and is suitable for use as a power source for, for example, a portable device, a hybrid vehicle, an electric vehicle, or the like.

REFERENCE MARKS IN THE DRAWINGS

1: cylindrical battery
10: battery can

10a: cylinder
10b: bottom
10d: opening edge
20: sealing member
21: sealing plate
22: cap
221: top plate
222: side wall
223: rib
224: holder
23: first gasket
24: second gasket
40: electrode body
50: lead
60: insulating plate

The invention claimed is:

1. A battery comprising:
a battery can including a cylinder and a bottom, the cylinder having a cylindrical shape and having an opening edge at a first end of the cylinder, the bottom closing a second end of the cylinder;
an electrode body housed in the cylinder; and
a sealing member fixed to the cylinder and sealing an opening surrounded by the opening edge, wherein
the sealing member has
a sealing plate electrically connected to a first electrode of the electrode body,
a cap having a through hole corresponding to the sealing plate, the cap being connected to the sealing plate in a state of being electrically insulated from the sealing plate, and
a first gasket that seals between the cylinder and the cap,
the first end and the second end of the cylinder face in an axial direction,
the cap has
a top plate having a ring shape, disposed radially outside of the cylinder along a peripheral edge of the sealing plate, and facing the cylinder,
a side wall that is erected in the axial direction from a peripheral edge of the top plate and extends and overlapping an outer surface of the cylinder, and
a rib that is erected in the axial direction from the top plate inside of the side wall and extends and overlapping an inner surface of the cylinder,
the first gasket is interposed between the rib and the cylinder in a state of being compressed in a radial direction of the cylinder, and
the battery can and the cap are electrically connected to a second electrode of the electrode body,
the battery further comprising:
a second gasket between the sealing plate and the cap, and
a holder holding the second gasket and erected in the axial direction from top plate inside of rib,
wherein the rib and the second gasket are provided apart from each other, and
the holder is provided apart from the rib.

2. The battery according to claim 1, wherein the first gasket is further compressed between the side wall and the cylinder.

3. The battery according to claim 1, wherein
the side wall has a first bent part that is bent inward in the radial direction of the cylinder, and
the side wall has an end facing outward in the radial direction of the cylinder from the first bent part and the end being electrically connected to the cylinder.

4. The battery according to claim 3, wherein
the opening edge has a second bent part that is bent inward in the radial direction of the cylinder, and
the rib has an outer surface that is inclined along an inclination direction of the opening edge facing outward in the radial direction of the cylinder from the second bent part.

5. The battery according to claim 1, wherein a connecting part having a larger dimension in the radial direction of the cylinder than a dimension of a remaining part of the rib in the radial direction of the cylinder, the connecting part between the rib and the top plate.

6. The battery according to claim 1, wherein the first gasket has a surface that is in contact with the opening edge provided with a protrusion protruding in the radial direction of the cylinder in an unloaded state.

7. The battery according to claim 1, wherein
the opening edge has an inner diameter that is smaller than an inner diameter of a remaining part of the cylinder, and
the side wall has a maximum value of an outer diameter that is equal to or less than an outer diameter of a part of the cylinder other than the opening edge.

8. The battery according to claim 1, wherein
a portion of the first gasket is interposed and compressed between the side wall and the opening edge, and
a lower end of the side wall directed toward the bottom is below a lower end of said portion of the first gasket directed toward the bottom.

* * * * *